(12) United States Patent
Sugizaki et al.

(10) Patent No.: US 6,382,231 B2
(45) Date of Patent: May 7, 2002

(54) FUEL CUTOFF VALVE AND PRODUCTION METHOD THEREOF

(75) Inventors: Tomohiro Sugizaki; Masanori Nojiri, both of Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/801,051

(22) Filed: Mar. 8, 2001

(30) Foreign Application Priority Data

Mar. 9, 2000 (JP) .......................................... 2000-064315
Feb. 20, 2001 (JP) .......................................... 2001-042859

(51) Int. Cl.$^7$ ............................................... F16K 24/04
(52) U.S. Cl. ...................... 137/15.26; 137/43; 137/202; 137/587
(58) Field of Search ................................. 137/15.26, 43, 137/202, 587

(56) References Cited

U.S. PATENT DOCUMENTS

| 5,139,043 A | 8/1992 | Hyde |
| 5,404,907 A | 4/1995 | Benjey |
| 5,522,417 A | * 6/1996 | Tomioka et al. ............ 137/202 |
| 6,035,883 A | * 3/2000 | Benjey ........................ 137/202 |

FOREIGN PATENT DOCUMENTS

JP  11-315765  11/1999

* cited by examiner

*Primary Examiner*—Gerald A. Michalsky
(74) *Attorney, Agent, or Firm*—Pillsbury Winthrop LLP (57) ABSTRACT

A fuel cutoff valve and a method for making the same having a simpler mounting operation and excellent sealing properties are disclosed. The fuel cutoff valve includes a cover, a casing made of a different resin than the cover wherein the casing includes a valve chest and a valve body accommodated in the valve chest. The casing is used as an insert member having a plurality of sealing ribs projecting substantially vertically towards the cover, and a stopper formation forming a substantially horizontal step at substantially right angles to the sealing ribs, and the cover is integrally formed therewith so as to enclose the sealing ribs and stopper formation of the casing. The fuel cutoff valve may also be constructed such that the cover is used as the insert member as opposed to the casing. The stopper formation can be a rib, a recess or a through-hole.

30 Claims, 8 Drawing Sheets

FUEL CUTOFF VALVE AND PRODUCTION METHOD THEREOF

This application claims priority from Japanese patent applications No. 2000-64315, filed on Mar. 9, 2000 and No. 2001-42859, filed on Feb. 20, 2001, the complete disclosures of which are hereby incorporated herein by reference.

BACKGROUND OF THE INVENTION

1. Field of the Invention

The present invention relates to a fuel cutoff valve for mounting onto the upper wall of a fuel tank to open and close a fuel conduit that connects the fuel tank to the outside to facilitate removal of fuel vapors from the fuel tank.

2. Description of Related Art

Figure 11:
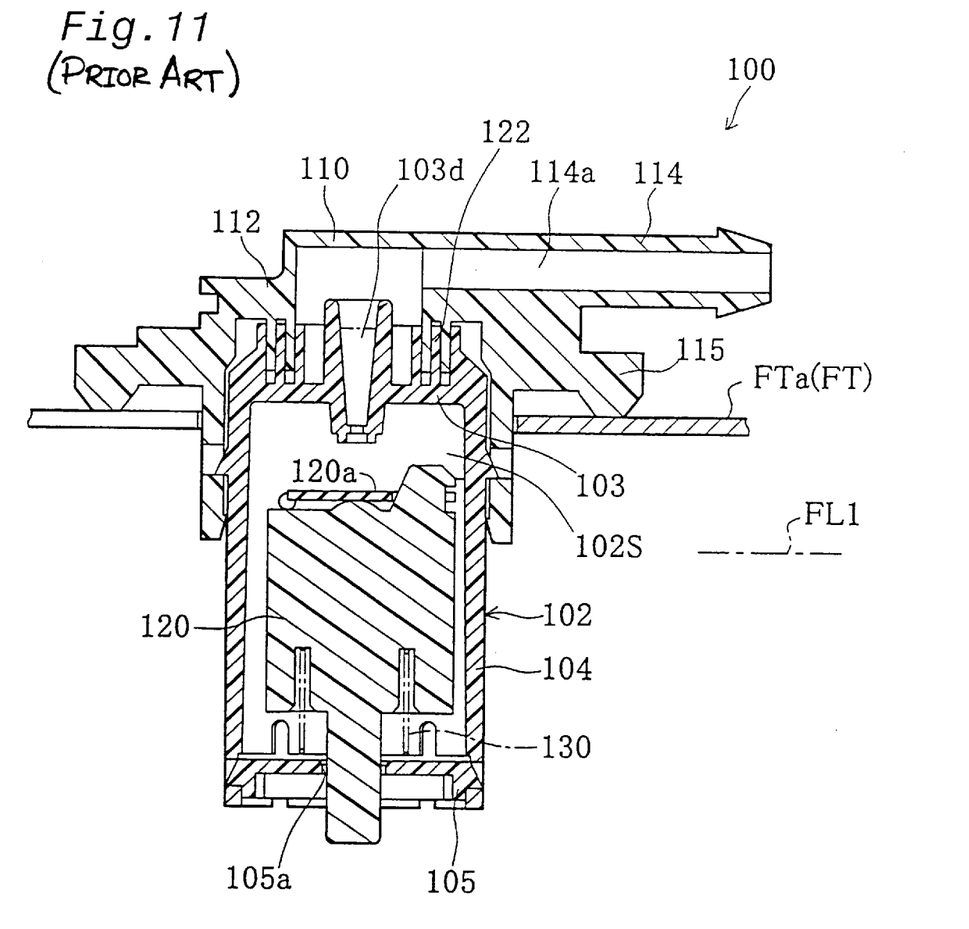
FIG. 11 is a sectional view showing a conventional fuel cutoff valve.

Fuel cutoff valves of this kind are known in the art, being described in JPA 11-315765, which has the structure depicted in FIG. 11. As will be apparent from the sectional view in FIG. 11, the fuel cutoff valve 100 is mounted on the upper tank wall FTa of a fuel tank FT, and comprises a casing 102, a cover 110, a float 120, and a spring 130. The casing 102 comprises a top wall 103, a side wall 104 integrally formed with outside edge of top wall 103, and a base plate 105 attached to the bottom end of side wall 104 so as to define an internal space constituting a valve chest 102S. Within valve chest 102S is housed a float 120 having a valve portion 120a in its upper portion. This valve portion 120a opens and closes a fuel conduit 103d connected to the outside of fuel tank FT. The float 120 is supported by a spring 130 arranged on the base plate 105.

The cover 110 comprises a cover main body 112 for attachment to the casing 102, a cover passage forming portion 114, and a flange 115, these elements being of unitary construction. The cover 110 is a separate element from the casing 102 and is assembled with the casing by fitting the two together. A leak-prevention rib 122 is interposed between casing 102 and cover 110 to create a labyrinth structure providing increased mating surface area for sealing.

When the fuel tank FT is being filled, fuel vapor present within fuel tank FT flows to the outside (canister) via a through-hole 105a formed in the base plate 105 of casing 102, a through-hole (not shown) in side wall 104, the valve chest 102S, the fuel conduit 130d, and the passage 114a in cover 110. When the fuel entering fuel tank FT reaches a predetermined level FL1, fuel flows into valve chest 102S via through-hole 105a, providing a buoyant force that causes the float 120 to rise. The rise of float 120 causes the valve portion 120a formed in the top portion of float 120 to block fuel conduit 103d, preventing fuel from flowing out from the fuel tank FT.

With the fuel cutoff valve 100 described above, however, the cover 110 and casing 102 are assembled together via a leak-prevention rib 122. Accordingly, if the gap therebetween is small, the cover 110 and casing 102 will be difficult to assemble. Conversely, if the gap is made larger in order to facilitate assembly, a poor seal will result. The conventional fuel cutoff valve 100 thus has the drawback that it is difficult to simultaneously provide a better seal while attempting to improve the ease of assembly.

SUMMARY OF THE INVENTION

An aspect of this invention is to provide a fuel cutoff valve featuring a simplified assembly operation as well as an excellent seal.

Specifically, the first embodiment of the present invention provides for a fuel cutoff valve for mounting on the upper tank wall of a fuel tank having a cover, casing and valve body. The upper portion of the casing constitutes an insert member having a plurality of sealing ribs projecting substantially vertically towards the cover, and a stopper formation extending at substantially right angles to the sealing ribs. The cover is unified with the upper portion of the casing by means of overmolding such that said sealing ribs and stopper formation are embedded in the cover. The cover is fabricated of a first resin material that is thermally weldable to the upper tank wall. The cover has an annular welding end for thermal welding onto the upper tank wall and a passageway for removing fuel vapor from the fuel tank. The casing is made of a second resin material different from the first resin material. The casing is further provided with a valve chest that connects the fuel tank interior to a fuel conduit connecting the fuel tank interior to the outside to facilitate fuel vapor removal. The valve body is housed within the valve chest and opens or closes off the fuel conduit depending on the fuel level in said fuel tank.

The valve body housed within this valve chest rises and falls with changes in buoyant force produced by changes in fuel level within the fuel tank. When the valve body rises due to buoyant force, it closes off the fuel conduit, preventing outflow of fuel from the tank. The cover is made of a resin material that is thermally weldable to the top of the tank, and is mounted onto the tank by means of thermal welding to the upper tank wall. In this way, the need for a fastening member on the top of the fuel tank is obviated, allowing for easy mounting of the fuel cutoff valve.

The casing is made of a different resin material than the cover, which is specifically a resin having better resistance to fuel swelling than the cover, to improve sealing in the seat portion, etc. The casing consists of a resin material that is not welded to the cover, but is unified with the cover by means of overmolding. Specifically, the casing constitutes an insert member having a plurality of sealing ribs projecting substantially vertically or upward towards the cover, and a stopper formation extending at substantially right angles to the sealing ribs, the cover being unified with the upper portion of the casing by overmolding such that the sealing ribs and stopper formation are embedded in the cover. As used herein, overmolding refers to a process wherein, after initially molding the cover or casing, the companion part is formed by injection molding in such a way as to partially enclose the first part; it includes various processes such as insert molding and two-color molding. Since the casing is used as an insert member and is integrally formed with the cover, the two resin materials, while not being welded together, fit together tightly so that fuel cannot leak out between them. The labyrinth structure created by the plurality of sealing ribs provides an extended passage for fuel vapors, affording reduced passage of fuel.

The cover experiences greater swelling by fuel in the fuel tank than does the casing, which has the effect of reducing the gaps at the locations of the sealing ribs and thereby increasing the connecting force thereof to the casing, affording even greater reductions in passage of fuel.

The stopper formation is at least one substantially horizontal step that extends at substantially a right angle to the sealing ribs and provides secure attachment between the cover and the casing in effect locking these elements together. The horizontal step includes but is not limited to a protruding member, a stopper hole that includes a recess or through-hole subsequently filled by overmolding, or a combination thereof. This obviates the need for structures that include engagement tabs or the like for attaching the cover and the casing together, so as to provide a simpler structure. Therefore the casing does not give rise to problems associated with chatter against the cover, namely, reduced mechanical strength to resist impact and change in the liquid level at which the fuel cutoff valve opens and closes, thereby providing stable opening and closing characteristics.

The sealing ribs are composed of a plurality of divided arcuate projecting portions in an annular configuration. These arcuate projecting portions are arranged such that the gaps separating them from their neighbors do not lie on straight lines passing through the centers of concentric circles. By means of this structure, resin flowing into the sealing ribs and stopper formation may proceed smoothly during overmolding of the cover onto the upper portion of the casing, thereby avoiding filling defects.

In another embodiment, the upper portion of the casing is further provided with an outer rib situated to the outside of the sealing ribs across a predetermined gap. The outer rib projects out such that it is integrally linked in an annular configuration. Since the outer rib is integrally linked in an annular configuration, mechanical strength to resist injection pressure during the overmolding process is high, and the casing and cover may be securely attached without falling over. Also, this annular configuration of the outer rib provides an improved gas-tightness relative to the sealing ribs, which are arcuate projecting portions.

The outer rib can be provided with a recess, a through-hole or a projection extending from the center of the casing to its outside wall. Since the recess, a through-hole or a projection in the outer rib becomes filled with the resin of the cover during fabrication of the cover by overmolding, the cover may be attached more securely to the upper portion of the casing through the use of such stopper formations.

A flash eliminating rib can also be provided along the circumference of the outside wall of the casing, at joining locations with the cover. The flash eliminating rib has the effect of blocking the flow of molten resin along the outside wall of the casing during fabrication of the cover by overmolding thereby reducing the amount of flash which forms.

Where the upper tank wall is polyethylene, the first resin may consist of the same polyethylene as the upper tank wall and the second resin material may consist of a polyacetal or polyamide having excellent resistance to fuel swelling.

The invention also encompasses a fuel cutoff valve for mounting on the upper tank wall of a fuel tank having a cover, a casing, and a valve body. The cover, rather than the casing, constitutes an insert member having a plurality of sealing ribs projecting substantially vertically towards the casing and a stopper formation extending at substantially right angles to the sealing ribs. The casing is unified with said cover by means of overmolding such that said sealing ribs and stopper formation are embedded in the casing. The cover is fabricated of a first resin material that is thermally weldable to the upper tank wall. The cover has an annular welding end for thermal welding onto the upper tank wall and a fuel conduit. The casing is made of a second resin material different from the first resin material. It is provided with a valve chest, which connects the fuel tank interior with the fuel conduit. The fuel conduit connects the fuel tank to the outside. In this variation of the invention, the fuel conduit at least in part has a connecting passage located in the casing that connects the fuel tan to an area outside of the fuel cutoff valve thereby effectuating vapor removal from the fuel tank. The valve body is housed within the valve chest and opens or closes off the fuel conduit depending on the fuel level in said fuel tank.

The fuel cutoff valve pertaining to this modification of the invention has sealing ribs and a stopper formation formed on the cover, the sealing ribs and stopper formation being overmolded to form the casing. Like the previously described embodiments, this modification affords secure attachment of the cover and casing.

Additionally, the present invention provides for the combination of a fuel tank comprising a resin upper tank wall having a fixation hole and a fuel cutoff valve mounted on the upper tank wall by insertion thereof partway into the fixation hole. The fuel cutoff valve has a cover, a casing and a valve body such that the upper portion of the casing constitutes an insert member having a plurality of sealing ribs projecting substantially vertically towards the cover and a stopper formation extending at substantially right angles to the sealing ribs. The cover is unified with the upper portion of the casing by means of overmolding such that the sealing ribs and stopper formation are embedded in the cover. The cover is fabricated of a first resin material that is thermally weldable to the upper tank wall and has a welding end for thermal welding onto the upper tank wall. As with all embodiments and modifications of the present invention, the cover may have a passageway that connects to or may be part of the fuel conduit connecting the interior of the fuel tank to the outside, thus facilitating fuel vapor removal. The casing is made of a second resin material different from the first resin material, and is provided with a valve chest connecting the fuel tank interior with the fuel conduit including a connecting passage of the casing which then connects to a tubular member or other passageway in the cover. The valve body is housed within the valve chest and opens or closes off the fuel conduit depending on the fuel level in said fuel tank.

The present invention also provides a process for manufacturing a fuel cutoff valve. A cover is fabricated from a first resin material that is thermally weldable to the upper tank wall, and has welding end for thermal welding onto the upper tank wall. The casing is formed from a second resin material different from the first resin material and has a fuel conduit. The casing has a plurality of sealing ribs projecting substantially vertically towards the cover and a stopper formation extending at substantially right angles to the sealing ribs are formed in the upper portion of the casing. The portion of the casing having the sealing ribs and stopper formation is set in the cavity of a mold. Then the cover is integrally molded with the upper portion of the casing by means of overmolding through injection of the first resin material into the cavity. This process for manufacturing the fuel cutoff valve may be used to form the embodiments of the present invention.

DETAILED DESCRIPTION OF PREFERRED EMBODIMENTS OF THE INVENTION

Figure 1:
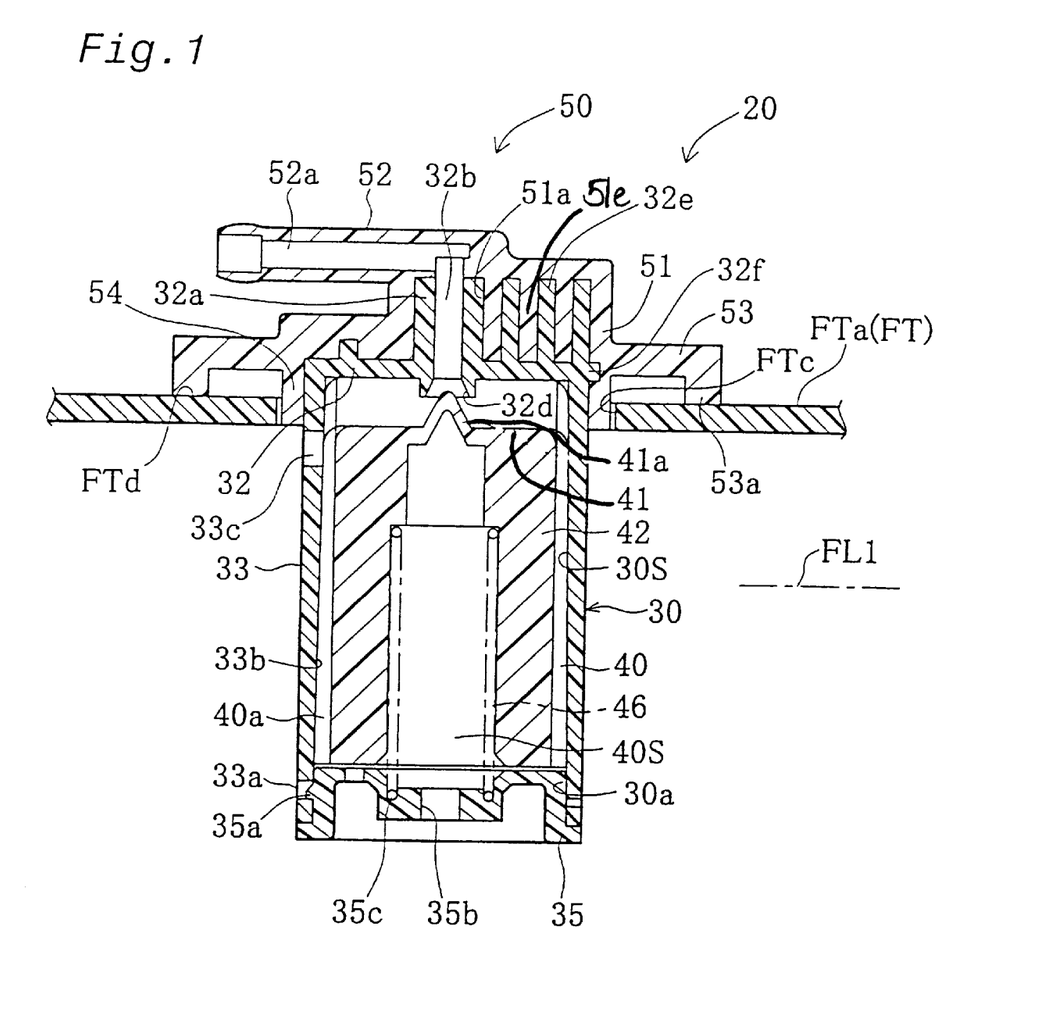
FIG. 1 is a sectional view showing a fuel cutoff valve 20 pertaining to a first embodiment of the invention, mounted on top of an automobile fuel tank FT.

FIG. 1 is a sectional view showing a fuel cutoff valve 20 pertaining to a first embodiment of the invention, mounted on top of an automobile fuel tank FT. In FIG. 1, the surfaces of fuel tank FT are made of a composite resin that includes polyethylene. A fixation hole FTc is provided in the upper tank wall FTa thereof. The fuel cutoff valve 20 is mounted on upper tank wall FTa with the lower portion thereof inserted into fixation hole FTc. During filling, when the fuel in fuel tank FT reaches a predetermined level FL1, fuel cutoff valve 20 prevents outflow thereof to the outside (canister).

Figure 2:
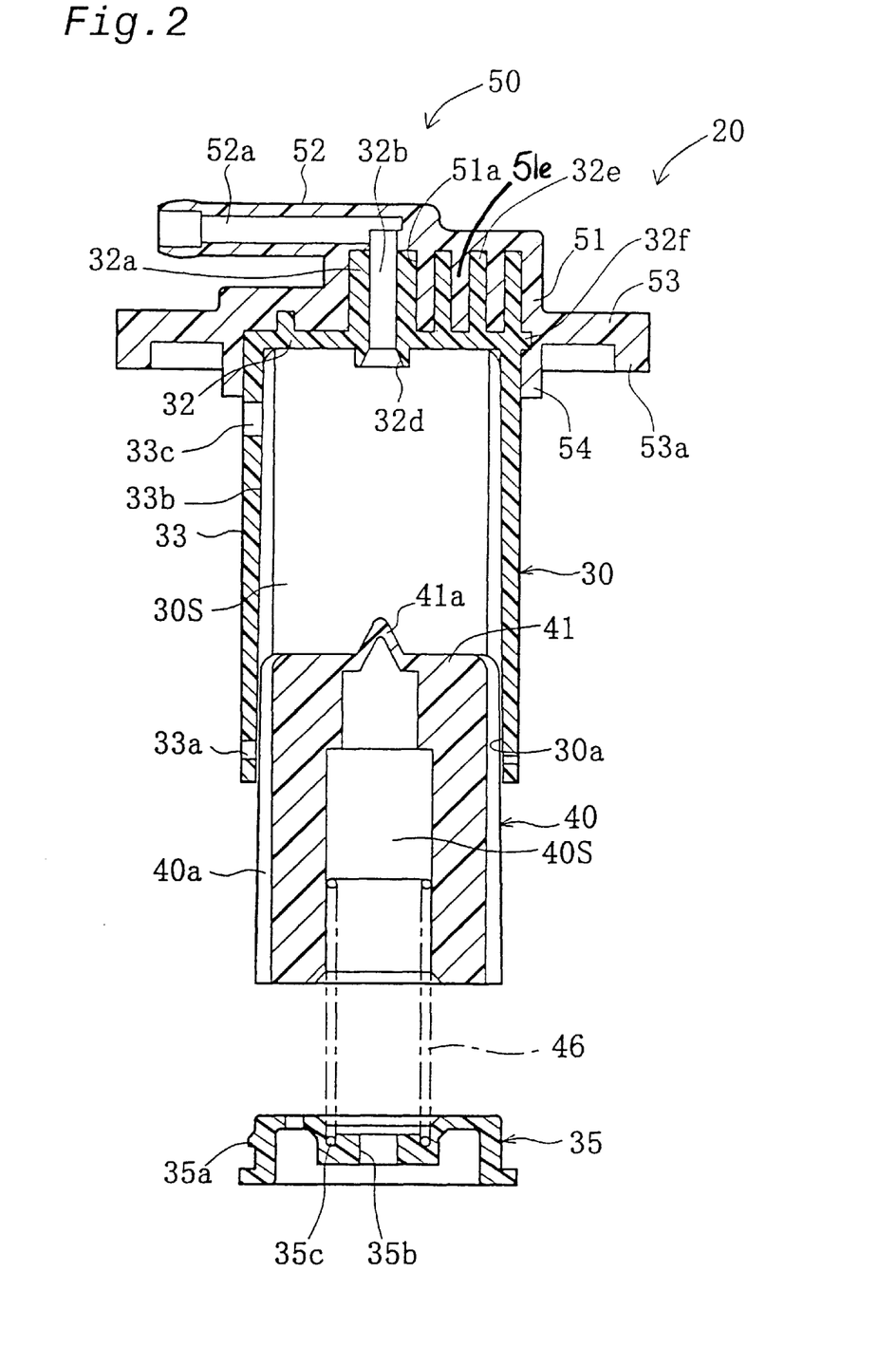
FIG. 2 is an exploded sectional view of the fuel cutoff valve 20.

FIG. 2 is an exploded sectional view of the fuel cutoff valve 20. The fuel cutoff valve 20 comprises the principal elements of a casing 30, a base plate 35, a float 40, a spring 46, and a cover 50. The casing 30, base plate 35, and float 40 preferably are made of polyacetal synthetic resin, which has excellent resistance to fuel oil permeation. The cover member 50, on the other hand, preferably consists of polyethylene, which has excellent resistance to fuel oil permeation and is thermally weldable to fuel tank FT. While both of these resin materials are resistant to fuel swelling, the polyacetal which makes up casing 30 and float 40 has better resistance to fuel swelling than does the polyethylene of the fuel tank FT and cover 50, thereby improving seal characteristics. Of course, other suitable materials can be used.

The casing 30 comprises a top wall 32 and a side wall 33 that extends in a tubular configuration downward from the top wall 32 so as to define a valve chest 30S of cup configuration enclosed by the top wall 32 and side wall 33. The bottom thereof forms a bottom opening 30a. In the center of the top wall 32 of casing 30 there is formed an upper projecting portion 32a. The upper projecting portion 32a is perforated by a connecting passage 32b, with the valve chest 30S end of the connecting passage 32b forming a conical seat portion 32d. The connecting passage 32b at least in part forms the fuel conduit.

An engagement orifice 33a is formed in the base of the side wall 33. This engagement orifice 33a is used for mounting the base plate 35, described later.

The base plate 35 provides closure to the bottom opening 30a of the casing 30. By engaging an engagement portion 35a formed on the outside periphery thereof within the engagement orifice 33a, the base plate 35 may be attached so as to provide closure to the bottom opening 30a. In the center of the base plate 35 is formed a through-hole 35b through which the valve chest 30S communicates with the interior of the fuel tank FT. The interior of the fuel tank FT therefore communicates with the valve chest 30S via through-hole 35b. An annular spring support portion 35c is formed in the central upper portion of the base plate 35. This spring support portion 35c supports a spring 46 between itself and the inside bottom surface of the float 40.

Figure 3:
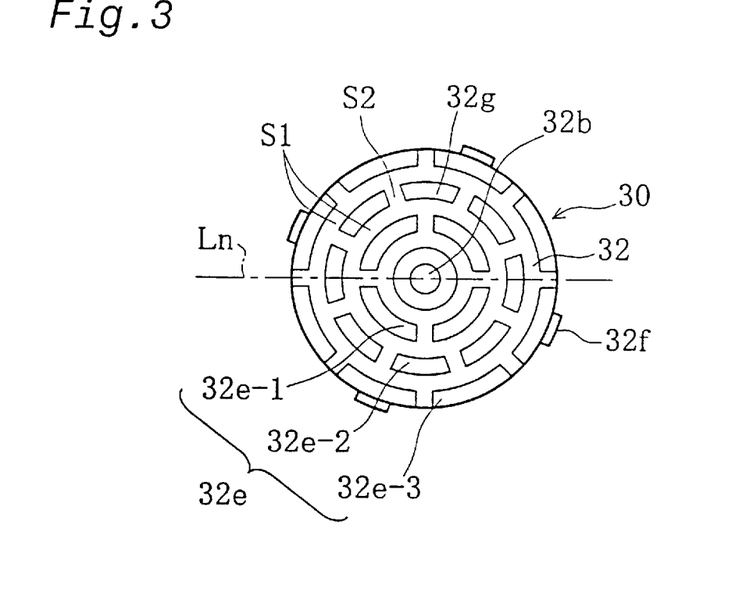
FIG. 3 is a plan view of casing 30 of the first embodiment.
Figure 4:
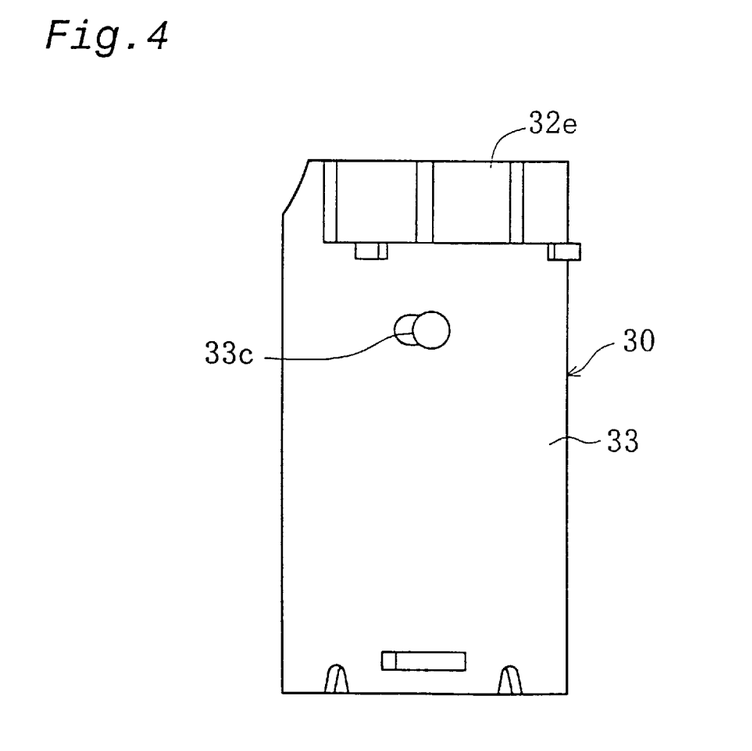
FIG. 4 is a side view of casing 30 of the first embodiment.
Figure 5:
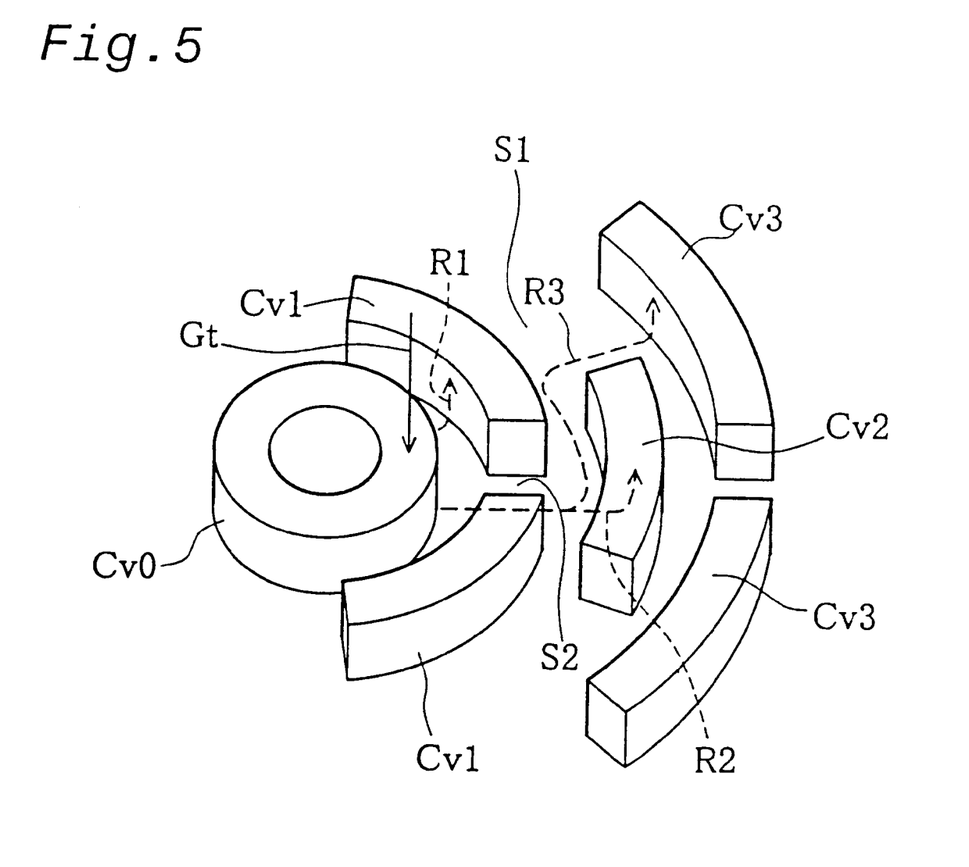
FIG. 5 is an illustrative diagram illustrating molten resin flow during injection molding of casing 30.

FIG. 3 is a plan view of casing 30, and FIG. 4 is a side view of casing 30. Referring to FIGS. 3 and 4, a plurality of sealing ribs 32e projecting upward towards the cover 50 are provided in the upper portion of casing 30. As shown in FIG. 3, the sealing ribs 32e are arranged on concentric circles centered on the connecting passage 32b and take the form of arcuate projections. Specifically, the first through third annular portions 32e-1, 32e-2, and 32e-3, are arranged in concentric circles starting at the center of the casing 30 and going to the inside edge side of the casing. Gaps S1 are situated between first annular portion 32e-1 and second annular portion 32e-2 and between second annular portion 32e-2 and third annular portion 32e-3. Gaps S2 are present between the individual arcuate projections in each of the first through third annular portions 32e-1, 32e-2, and 32e-3. Gaps S2 in first through third annular portions 32e-1, 32e-2, and 32e-3 are offset in the circumferential direction with respect to a straight line Ln passing through the center circle. The reason for this arrangement of gaps S1 and S2 is as follows. FIG. 5 is an illustrative diagram illustrating molten resin flow during injection molding of cover 50. In FIG. 5, a gate Gt is provided in the central portion around the cavity Cv0 for forming connecting passage 32b. The mold structure is such that molten resin is directed towards the outside edge. Also, cavities Cv1 to Cv3 for forming the first through third annular portions 32e-1, 32e-2, and 32e-3 are provided. Resin flows from gate Gt into cavity Cv1 along path R1, resin flows through gaps S2 into cavity Cv2 along path R2, and resin flows through gaps S2 and S1 into cavity Cv3 along path R3. In this way, the cavities for molding the outer second and third annular portions 32e-2 and 32e-3 are reliably filled with resin, without weakening the flow of resin due to the inner cavity. Filling defects in the cavities are thus avoided, and the casing 30 may be endowed with high joining strength along with the cover 50 to give excellent sealing.

A stopper formation 32f, in this case the stopper rib, projects from the top end of top wall 32. The stopper formation 32f extends at substantially a right angle to the sealing ribs 32e. The upper portion of casing 30 is employed as an insert for cover 50, with the sealing ribs 32e and stopper formation 32f being unified through enclosure by cover 50. In other words, while casing 30 and cover 50 consist of different resin materials and are thus not thermally welded together, they mate tightly in a labyrinth structure.

The float 40 housed within the valve chest 30S comprises a top wall 41 and a tubular sidewall 42 extending downward from the outside edge of the top wall 41 to define a container configuration. The interior space thereof serves as a buoyancy chamber 40S for producing buoyancy. A guide rib 40a is formed along the outside periphery of the float 40.

The cover 50 comprises a cover main body 51, a tube member 52 projected in an "L" configuration from the center of the top of the cover main body 51, a flange 53 formed on the outside periphery of the cover main body 51, and a cylindrical portion 54 projecting from the bottom of the cover main body 51, these elements are formed as one piece. In the center of the bottom of the cover main body 51, a cover mating portion 51a for mating with the upper projecting portion 32a of the casing 30 is formed. The tube member 52 has formed therein a cover passage 52a, a first end of the cover passage 52a being connected to the connecting passage 32b of the casing 30 and a second end thereof being connected to the canister. At the bottom edge of the flange 53, an annular welding end 53a for welding to the upper tank wall FTa of the fuel tank FT is formed. The cylindrical portion 54 projects in a cylindrical configuration so as to enclose the top wall of the casing 30.

The cover 50 is integrally formed with the casing 30. Specifically, the casing is set in the mold as an insert member, and the cover 50 is integrally molded therewith.

Because of this integral molding, the sealing ribs 32e of the casing 30 extend in the vertical direction from the bottom face of the cover 50 and the stopper formation 32f extends outwardly in the plane from the inside of cover 50, with the cylindrical portion 54 fitting about the outside of the casing 39 with no gap therebetween, so that the elements are unified.

The procedure for mounting fuel cutoff valve 20 on the upper tank wall FTa of fuel tank FT is now described. Prior to assembling fuel cutoff valve 20, integral molding of the cover 50 is performed by injection molding using the casing 30 as an insert member. The float 40 and spring 46 are then housed within the valve chest 30S of the casing 30, with the bottom end of the spring 46 arranged on the spring support portion 35c of the base plate 35 and the engagement portion 35a of the base plate 35 engaged within the engagement orifice 33a of the side wall 33 to attach the base plate 35 to the casing 30.

The bottom end of the annular welding end 53a of the cover 50 is then melted with a hot plate (not shown), and the rim of the fixation hole FTc of the fuel tank FT is melted with a hot plate (not shown) to produce a weld portion FTd. The casing 30 is then inserted bottom first into the fixation hole FTc, and the annular welding end 53a is forced against the weld portion FTd. Since the annular welding end 53a and the weld portion FTd are made of the same resin material, the two weld together upon cooling and hardening. By welding the cover 50 to the upper tank wall FTa in this way, a good seal between the fuel tank FT interior and the outside is provided.

Operation of the fuel cutoff valve 20 is now described. When fuel is supplied to the fuel tank FT during a fueling operation, the fuel level within the fuel tank FT rises, causing fuel vapor that has collected in the top of the fuel tank FT to escape to the canister via an air hole 33c in the casing, the valve chest 30S, the connecting passage 32b, and a cover passage 52a. When the fuel level within the fuel tank FT reaches a predetermined level FL1, fuel flows into the valve chest 30S via the through-hole 35b in base plate 35. This causes the float 40 to rise through buoyant force, whereby the valve portion 41a blocks off the connecting passage 32b so as to prevent outflow of fuel to the canister. Thus, during the process of refueling the fuel tank FT fuel vapors are allowed to escape from the fuel tank FT, while fuel is prevented from flowing out from the fuel tank FT.

The casing 30 is used as an insert member having a plurality of sealing ribs 32e and a stopper formation 32f, and is unified with the cover 50 by means of overmolding conducted so as to enclose the sealing ribs 32e and stopper formation 32f. Specifically, since the casing 30 and cover 50 are unified through overmolding, while the two resin materials are not welded together, they are joined tightly so that fuel does not leak between them. The labyrinth structure formed by the plurality of sealing ribs 32e provides an extended passage along the joint face going from the fuel tank FT to the connecting passage 32b, affording reduced leakage of fuel vapor.

The cover 50 has greater fuel swelling than the casing 30 and thus swells to a greater degree with the fuel in the fuel tank, reducing the gaps at the locations of the sealing ribs 32e and thereby increasing the connecting force thereof to the casing 30, affording even greater reductions in leakage of fuel vapor to the outside. Thus, there is essentially no gap between the fuel cutoff valve 20 and the upper tank wall, reducing leakage of fuel vapors to the outside.

As the stopper formation 32f extends at substantially a right angle to the sealing ribs 32e, the cover 50 and casing 30 are securely connected. This obviates the need for structures that include engagement tabs or the like for attaching the cover and the casing together, so as to provide a simpler structure. Since the casing 30 and the cover 50 are securely united, problems associated with chatter between the two, namely, reduced mechanical strength to resist impact and change in the liquid level at which the fuel cutoff valve 20 opens and closes, are avoided, thereby providing stable opening and closing characteristics.

Figure 6:
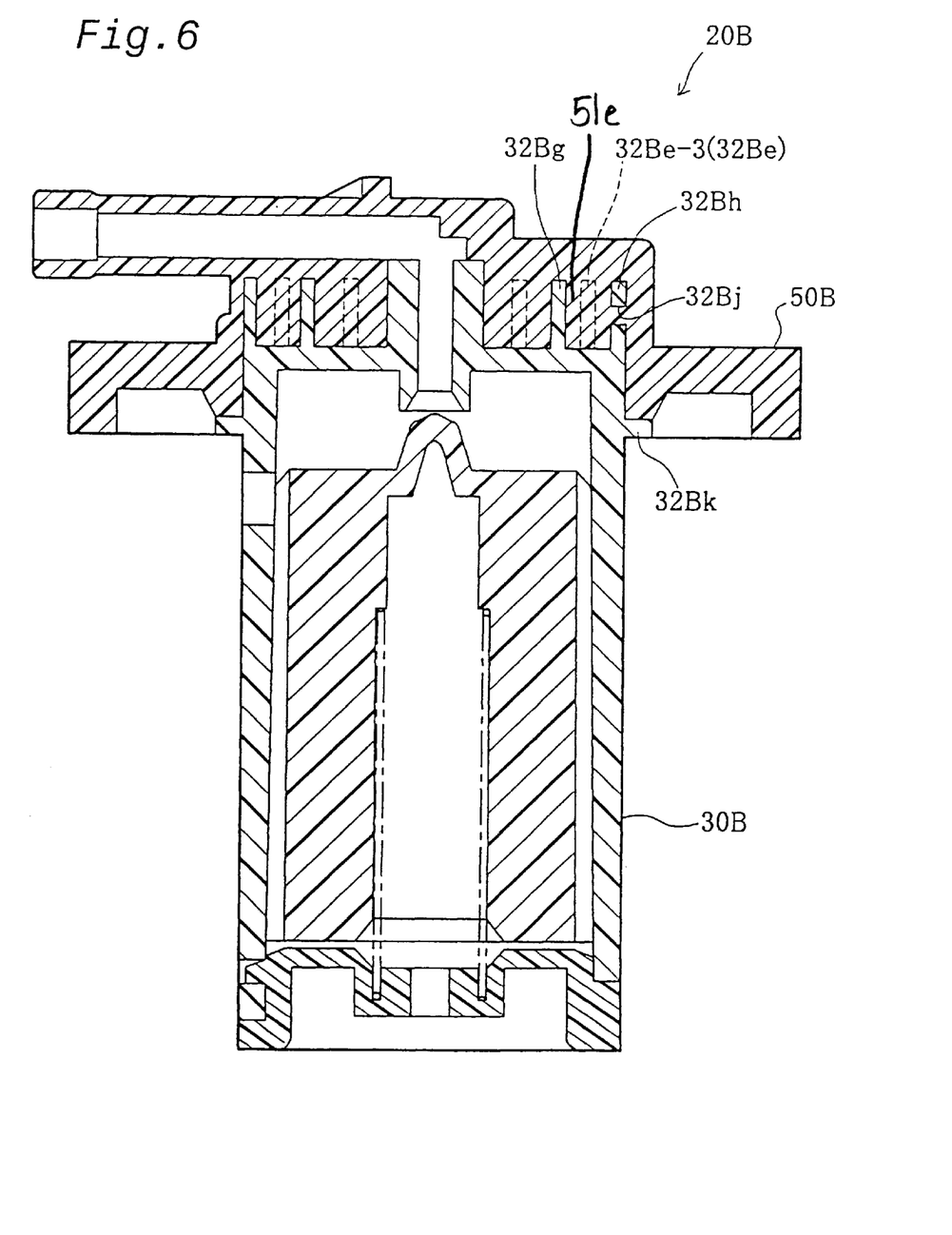
FIG. 6 is a sectional view showing a fuel cutoff valve 20B pertaining to a second embodiment.
Figure 7:
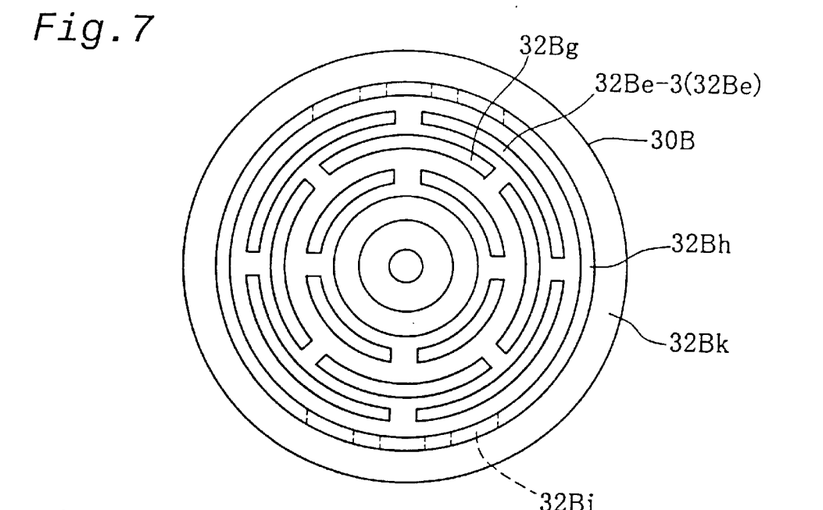
FIG. 7 is a plan view of casing of the second embodiment.
Figure 8:
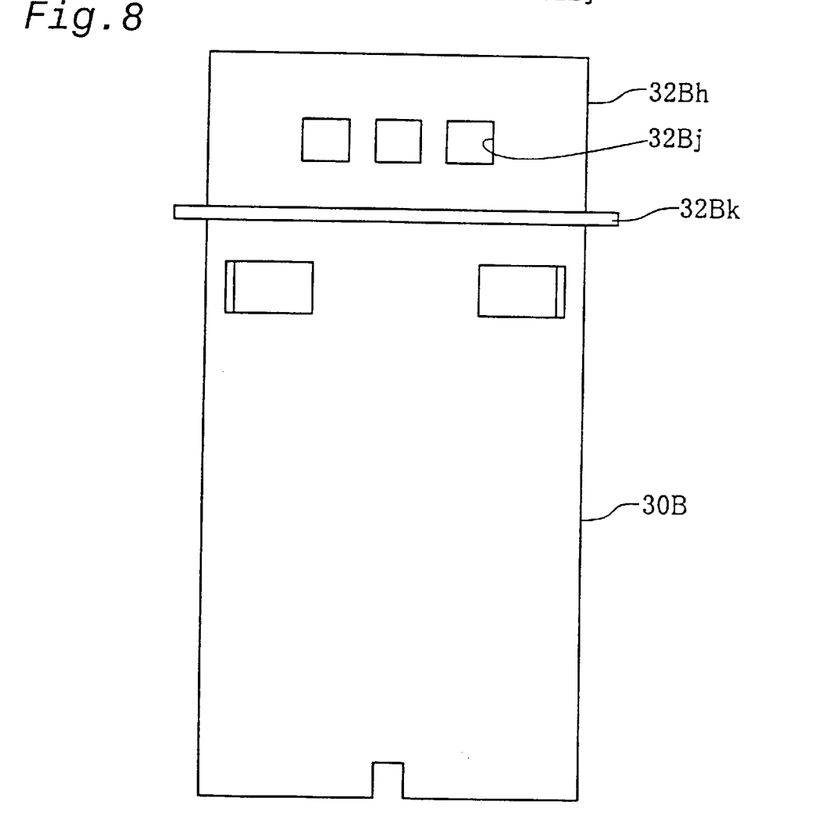
FIG. 8 is a side view of the casing of the second embodiment.

FIGS. 6 through 8 depict a fuel cutoff valve 20B pertaining to the second embodiment of the present invention. FIG. 6 is a sectional view of the fuel cutoff valve, FIG. 7 is a plan view of casing 30B, and FIG. 8 is a side view of casing 30B. The second embodiment differs from the first embodiment in terms of the shape and placement of the ribs projecting from the casing 30B.

Referring to FIGS. 7 and 8, the upper portion of the casing 30B is provided with a outer rib 32Bh projecting from the outmost edge adjacent to the sealing ribs 32Be, specifically, to the outside of the third annular portion 32Be-3 with a predetermined space therebetween. The outer rib 32Bh projects out and is integrally linked in an annular configuration. A stopper hole 32Bj is formed in outer rib 32Bh, extending from the center of casing 30B to the outside edge. In this case, the stopper hole 32Bj is the stopper formation. As the outer rib 32Bh is integrally linked in an annular configuration in the upper portion of casing 30B, when the cover 50B (see FIG. 6) is fabricated by overmolding, mechanical strength to resist injection pressure during the overmolding process is high, and the casing 30B and cover 50B may be securely attached without falling over. Since the outer rib 32Bh is integrally linked in an annular configuration, the area passing straight fuel vapors is smaller than that of the sealing ribs 32Be divided into arcuate projections 32Bg, thereby improving gas-tightness. Also, as the stopper hole 32Bj in outer rib 32Bh becomes filled with the resin of the cover 50B during fabrication of the cover 50B by overmolding, the cover 50B may be attached more securely to the upper portion of the casing 30B.

As shown in FIGS. 6 and 7, a flash eliminating rib 32Bk projects from the outside wall of the casing 30B. The flash eliminating rib 32Bk runs along the entire outside circumference of the casing 30B and projects at joining locations with the cover 50B. The flash eliminating rib 32Bk has the effect of blocking the flow of molten resin along the outside wall of the casing 30B during fabrication of the cover 50B by overmolding, reducing the amount of flash which forms.

Figure 9:
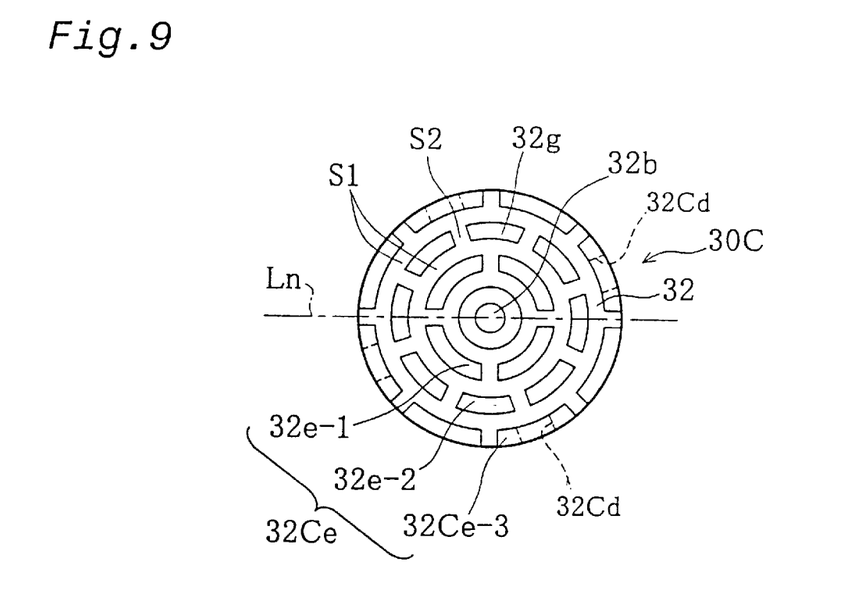
FIG. 9 is a plan view illustrating a the casing according to a third embodiment of the invention.
Figure 10:
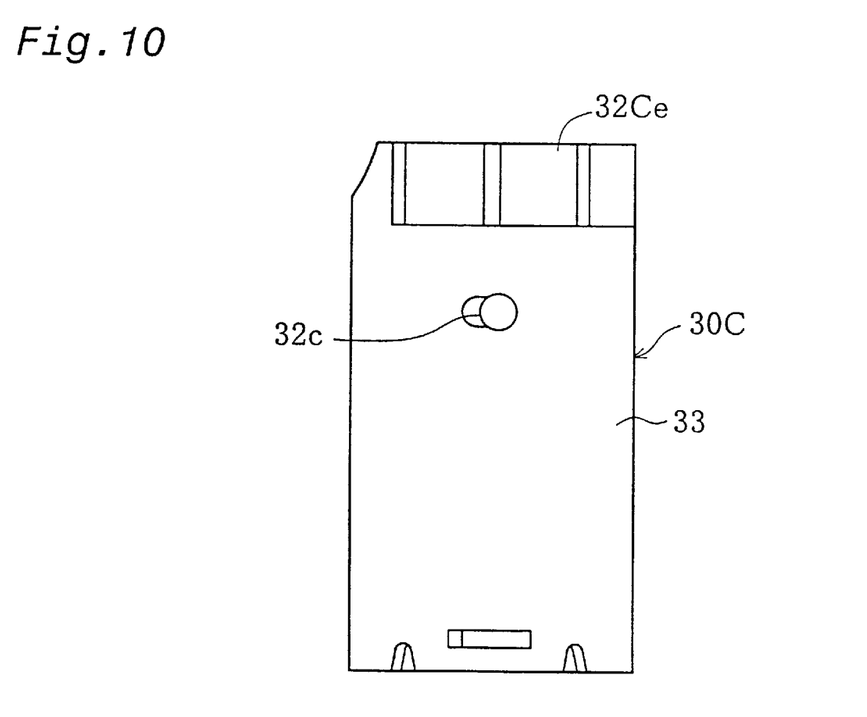
FIG. 10 is a side view illustrating a modification of the casing of the first embodiment.

FIGS. 9 and 10 show another cutoff valve exemplifying a third embodiment. FIG. 9 shows a plan view of casing 30C, and FIG. 10 is a side view of casing 30C. In FIGS. 9 and 10, a plurality of sealing ribs 32Ce projecting upward towards cover are provided in the upper portion of casing 30C. The sealing ribs 30C include first through third annular portions 32e-1, 32e-2, and 32Ce-3. A stopper hole 32Cd is formed in the third annular portions 32Ce-3 and serves as the stopper formation. As the stopper hole 32Cd becomes filled with the resin of the cover after fabrication of the cover by overmolding, the casing 30C may be attached more securely to the cover.

In the preceding embodiments, the casing 30 is employed as an insert member, but this is not limiting, since it is possible to use the cover 50 as an insert member. When the casing is used as the insert member, the casing is provided with sealing ribs 32e and a stopper formation, whereas, the cover has a mating portion 51a formed during the overmolding process. The mating portion 51a is includes the plurality of ribs 51e that interlock with the sealing ribs 32e located on the casing. Accordingly, when the cover is used as the insert member, the cover is formed first. Also, the stopper formation and, if desired, the outer rib are formed as part of the cover. In this case, the stopper rib 32f could be formed as a step or groove in the cover 50 that fills with resin from the casing 30 or as a protruding rib. Further, the outer rib 32Bh could be formed with a through-hole to form a stopper formation similar to the embodiments shown in FIGS. 6–10. In this instance, the cover 50 would be appropriately selected with reference to shape and moldability.

The invention is not limited to the embodiments set forth hereinabove, various other embodiments being possible without departing from the spirit of the invention, such as defined by the following claims

What is claimed is:

1. A fuel cutoff valve mountable on an upper tank wall of a fuel tank, the fuel cutoff valve comprising:
    a cover made of a first resin material that is thermally weldable to the upper tank wall, the cover including a welding end thermally weldable to the upper tank wall;
    a casing made of a second resin material different from the first resin material, the casing including an upper portion and a valve chest that is able to communicate with the fuel tank and at least a portion of a fuel conduit forming a passage from the fuel tank to the outside of the fuel cutoff valve,
    a valve body accommodated in the valve chest to open and close the fuel conduit according to a level of a liquid fuel in the fuel tank, wherein the upper portion of the casing has a plurality of sealing ribs and a stopper formation, the sealing ribs projecting substantially vertically towards the cover, the stopper formation forming a substantially horizontal step that extends at substantially right angles to the sealing ribs, and the cover is unified with the upper portion of the casing by overmolding to embed the sealing ribs and the stopper formation in the cover.

2. The fuel cutoff valve according to claim 1, wherein the sealing ribs are arranged in a plurality of concentric circular arrays centered on the fuel conduit.

3. The fuel cutoff valve according to claim 2, wherein the sealing ribs are formed of an array of a plurality of divided arcuate projections in an annular arrangement, the arcuate projections are separated by gaps such that the gaps separating the adjacent arcuate projections do not lie on a common radius with respect to adjacent concentric circular arrays.

4. The fuel cutoff valve according to claim 3, further comprising an outer rib formed on the upper portion of the casing and arranged outside of the sealing ribs across a predetermined gap, the outer rib projecting outwardly and integrally linked in an annular configuration.

5. The fuel cutoff valve according to claim 4, wherein the stopper formation is a stopper rib.

6. The fuel cutoff valve according to claim 5, wherein the stopper rib is integrally formed with the outer rib.

7. The fuel cutoff valve according to claim 4, wherein the stopper formation is a stopper hole extending radially through a center of the outer rib, the stopper hole being filled with the resin of the cover.

8. The fuel cutoff valve according to claim 4, wherein the stopper formation is a stopper hole integrally formed with at least one sealing rib, the stopper hole being filled with the resin of the cover.

9. The fuel cutoff valve according to claim 4, wherein the stopper formation is a recess formed in the outer rib, the recess being filled with the resin of the cover.

10. The fuel cutoff valve according to claim 4, wherein the stopper formation is a recess formed in at least one sealing rib, the recess being filled with the resin of the cover.

11. The fuel cutoff valve according to claim 1, wherein the stopper formation is a stopper rib.

12. The fuel cutoff valve according to claim 1, wherein the stopper formation is a stopper hole integrally formed in at least one sealing rib, the stopper hole being filled with the second resin of the cover.

13. The fuel cutoff valve according to claim 1, wherein the stopper formation is a recess formed in at least one sealing rib, the recess being filled with the second resin of the cover.

14. The fuel cutoff valve according to claim 1, further comprising a flash eliminating rib radially formed on the upper portion of the casing.

15. The fuel cutoff valve according to claim 1, wherein the first resin material has greater fuel swelling than the second resin material.

16. The fuel cutoff valve according to claim 1, wherein a resin material of the upper tank wall and the first resin material are polyethylene, and the second resin material is selected from the group consisting of polyacetal and polyamide.

17. The fuel cutoff valve according to claim 1 in combination with the fuel tank, wherein the fuel tank comprises a resin and has a fixation hole for mounting the fuel cutoff valve by insertion thereof partway into the fixation hole.

18. The fuel cutoff valve according to claim 1, wherein the valve body comprises a float housed within the valve chest, wherein the float has a top wall with valve portion extending upward therefrom for opening and closing the fuel conduit.

19. A fuel cutoff valve mountable on an upper tank wall of a fuel tank, the fuel cutoff valve comprising:
    a cover made of a first resin material that is thermally weldable to the upper tank wall, the cover including a welding end thermally weldable to the upper tank wall;
    a casing made of a second resin material different from the first resin material, the casing including an upper portion and a valve chest that is able to communicate with the fuel tank and at least a portion of a fuel conduit forming a passage from the fuel tank to the outside of the fuel cutoff valve;
    a valve body accommodated in the valve chest to open and close the fuel conduit;
    wherein the cover has a plurality of sealing ribs and a stopper formation, the sealing ribs projecting substantially vertically towards the casing, the stopper formation forming a substantially horizontal step at substantially right angles to the sealing ribs; and
    wherein the casing is unified with the cover by overmolding to embed the sealing ribs and the stopper formation in the casing.

20. The fuel cutoff valve according to claim 19 in combination with the fuel tank, wherein the fuel tank comprises a resin and has a fixation hole for mounting the fuel cutoff valve by insertion thereof partway into the fixation hole.

21. A fuel tank comprising a resin upper tank wall having a fixation hole and a fuel cutoff valve mounted on the upper tank wall by insertion thereof partway into the fixation hole, the fuel cutoff valve comprising:
    a cover made of a first resin material that is thermally weldable the upper tank wall, the cover including a welding end thermally welded to the upper tank wall;
    a casing that is made of a second resin material different from the first resin material, the casing including a valve chest that is able to communicate with the fuel tank and at least a portion of a fuel conduit forming a passage from the fuel tank to the outside of the fuel cutoff valve;

a valve body accommodated in the valve chest to open and close the fuel conduit according to a level of a liquid fuel in the fuel tank, wherein the upper portion of the casing has a plurality of sealing ribs and a stopper formation, the sealing ribs projecting substantially vertically towards the cover, the stopper formation forming a substantially horizontal step that extends at substantially right angles to the sealing ribs, and wherein the cover and the upper portion of the casing are unified by overmolding to embed the sealing ribs and the stopper formation with the cover.

22. The fuel cutoff valve according to claim 21, wherein the cover is molded over the casing.

23. The fuel cutoff valve according to claim 21, wherein the casing is molded over the cover.

24. The fuel cutoff valve according to claim 21, wherein the stopper formation is a stopper rib protruding outwardly.

25. The fuel cutoff valve according to claim 21, wherein the stopper formation is a stopper hole integrally formed in at least one sealing rib.

26. The fuel cutoff valve according to claim 21, further comprising an outer rib formed on the upper portion of the casing and arranged outside of the sealing ribs across a predetermined gap, the outer rib projecting outwardly and integrally linked in an annular configuration, wherein the stopper formation is a stopper hole extending radially through a center of the outer rib.

27. A process for manufacturing a fuel cutoff valve mountable on an upper tank wall of a fuel tank, the process comprising:

forming a casing from a resin material including forming a plurality of sealing ribs and a stopper formation, the sealing ribs projecting outward and the stopper formation forming a substantially horizontal step that extends at substantially right angles to the sealing ribs;

setting the casing in a cavity of a mold; and forming a cover that is thermally weldable to the upper tank wall from a different resin material than the resin material of the casing by injecting the different resin material into the cavity to enclose the sealing ribs and stopper formation, thereby integrally molding the cover with the upper portion of the casing.

28. The fuel cutoff valve manufacturing process according to claim 27 further comprising thermofusing the fuel cutoff valve onto the upper wall of the fuel tank.

29. The fuel cutoff valve manufacturing process according to claim 27, wherein the first resin material has greater fuel swelling than the second resin material.

30. The fuel cutoff valve manufacturing process according to claim 27, wherein a resin material of the upper tank wall and first resin material are polyethylene, and the second resin material is selected from the group consisting of polyacetal and polyamide.

* * * * *